United States Patent [19]

Romocki

[11] Patent Number: 5,388,644

[45] Date of Patent: Feb. 14, 1995

[54] APPLICATION OF N,N-DIALKYLAMIDES TO REDUCE PRECIPITATION OF ASPHALT FROM CRUDE OIL

[75] Inventor: Julian Romocki, Calgary, Canada

[73] Assignee: Buckman Laboratories International, Inc., Memphis, Tenn.

[21] Appl. No.: 14,724

[22] Filed: Feb. 8, 1993

[51] Int. Cl.⁶ .................... E21B 37/06; E21B 43/22
[52] U.S. Cl. ................... 166/268; 166/279; 166/304; 166/310; 166/371
[58] Field of Search ............ 166/268, 273, 274, 279, 166/304, 305.1, 310, 371; 252/8.552; 507/90; 137/13

[56] References Cited

U.S. PATENT DOCUMENTS

| | | | |
|---|---|---|---|
| 2,302,697 | 11/1942 | Katzman | 252/357 |
| 2,873,253 | 2/1959 | Stanphill | 252/8.552 |
| 3,102,859 | 9/1963 | Anderson et al. | 252/8.552 X |
| 3,330,346 | 7/1967 | Jacobs et al. | |
| 3,421,582 | 1/1969 | Fallgatter | |
| 3,811,504 | 5/1974 | Flournoy et al. | 166/273 |
| 4,268,403 | 5/1981 | Buckman et al. | 252/8.554 |
| 4,490,263 | 12/1984 | Stapp et al. | 252/8.554 |
| 4,502,538 | 3/1985 | Wellington et al. | 166/252 |
| 4,554,082 | 11/1985 | Holtmyer et al. | 252/8.551 |
| 4,580,633 | 4/1986 | Watkins et al. | 166/295 |
| 4,676,316 | 6/1987 | Mitchell | 166/274 |
| 4,773,484 | 9/1988 | Chang et al. | 166/274 |
| 4,821,801 | 4/1989 | Van Laar | 166/304 X |
| 4,945,989 | 8/1990 | Irani et al. | 166/268 |
| 4,997,850 | 3/1991 | Karydas et al. | 166/304 X |

*Primary Examiner*—George A. Suchfield
*Attorney, Agent, or Firm*—Finnegan, Henderson, Farabow, Garrett and Dunner

[57] ABSTRACT

A method of reducing, preferably preventing, precipitation of asphalt from crude oil. In one aspect, crude oil is contacted in the borehole with at least one N,N-dialkylamide of a fatty acid having 8 to 22 carbon atoms. In an second aspect, precipitation is reduced during miscible flooding in an EOR process by adding to the flooding solvent at least one N,N-dialkylamide of a fatty acid having 8 to 22 carbon atoms.

13 Claims, 1 Drawing Sheet

APPLICATION OF N,N-DIALKYLAMIDES TO REDUCE PRECIPITATION OF ASPHALT FROM CRUDE OIL

BACKGROUND OF THE INVENTION

1. Field of the Invention

This invention relates to a method for the reduction, preferably, the prevention, of precipitation of asphalt from crude oil.

2. Description of the Prior Art

Primary production of petroleum hydrocarbons from oil bearing formations is usually accomplished by drilling into or through the oil-bearing strata. Oil then flows into the bore hole, from which it is recovered by pumping to the surface. In most formations, primary recovery or primary production recovers no more than about 25 to 35% of the oil in the formation. A number of techniques have been developed whereby additional oil can be recovered from these formations. Known collectively as secondary or enhanced oil recovery (EOR) techniques, these methods can increase production substantially. In some cases, recovery as high as 60 to 65% has been achieved.

When EOR becomes necessary, a number of the wells in a producing field are designed as injection wells, and a fluid such as water, solvent or a gas is charged to these wells under pressure sufficient to force residual oil out of the formation into the remaining production wells, whence it is pumped to the surface. This method is referred to as "flooding." When a fluid such as liquid natural gas or liquid $CO_2$ is employed in flooding, the method is referred to as "miscible flooding."

A serious problem, encountered with both primary and enhanced oil recovery, is the precipitation of asphaltenes and associated solid components (collectively referred to as asphalt), either within the oil-bearing formations or in the production borehole. This problem is encountered in at least one of its forms in virtually all oil fields since virtually all crude oil contains some amount of asphalt either in solution or in a colloidally dispersed state.

The asphalt remains dissolved or suspended as the case may be, so long as the oil remains subject to the ambient conditions found in its geological reservoir. A change in those conditions, however, can lead to harmful precipitation. Thus, precipitation of asphalts is frequently experienced within the oil-bearing formation during EOR when the crude oil is contacted with the miscible flooding solution. Even more frequently, precipitation occurs in the borehole when the oil is subjected to lower ambient temperature/pressure conditions. Precipitation in either location can lead to costly interruptions in production from the well while cleanup takes place.

Precipitated asphalt cleanup is usually accomplished by mechanical or chemical cleaning or by manipulating reservoir conditions (e.g. pressure or production rates). The approach to date has always been a remedial one and invariably requires the well or the formation to be out of production a period of time. There is great need for a preventive approach.

It is the objective of this invention to provide a method of preventing or at least reducing the precipitation of asphalt from crude oil.

SUMMARY OF THE INVENTION

In accordance with this invention, there is provided a method of reducing precipitation of asphalt from crude oil when subjected to conditions different from the conditions found in its geological reservoir, which method comprises contacting such crude oil with an effective amount of at least one compound of formula I $$R_3C(O)-N(R_1)(R_2) \qquad (I)$$

wherein $R_1$ is a substituted or unsubstituted $C_1-C_6$ alkyl group; $R_2$ is a substituted or unsubstituted $C_1-C_6$ alkyl group; and $R_3C(O)-$ is a substituted or unsubstituted fatty acid residue of 8 to 22 carbon atoms.

In one aspect of this invention, an improvement is provided to an enhanced oil recovery method which comprises:
flooding into an oil-bearing formation through an injection well a miscible flooding solvent selected from liquid natural gas and liquid carbon dioxide, wherein the solvent contains at least one compound of formula I $$R_3C(O)-N(R_1)(R_2) (I)$$

wherein $R_1$ is a substituted or unsubstituted $C_1-C_6$ alkyl group; $R_2$ is a substituted or unsubstituted $C_1-C_6$ alkyl group; and $R_3C(O)-$ is a substituted or unsubstituted fatty acid residue of 8 to 22 carbon atoms, in an amount effective to increase the pressure at which asphalt from crude oil begins to precipitate in the presence of the flooding solvent to a point greater than the ambient geological pressure in the formation.

In another aspect of this invention, a method of reducing precipitation of asphalt from crude oil in a producing borehole is provided which method comprises adding to the crude oil in the borehole, at a point where the asphalt is still stably dissolved or suspended in the crude oil, an amount of at least one compound of formula I $$R_3C(O)-N(R_1)(R_2) \qquad (I)$$

wherein $R_1$ is a substituted or unsubstituted $C_1-C_6$ alkyl group; $R_2$ is a substituted or unsubstituted $C_1-C_6$ alkyl group; and $R_3C(O)-$ is a substituted or unsubstituted fatty acid residue of 8 to 22 carbon atoms sufficient to decrease the temperature at which asphalt begins to precipitate from said crude oil to a temperature lower than the temperature the crude oil will encounter at the well head.

BRIEF DESCRIPTION OF THE DRAWING

The invention will be described, in part, with respect to the attached drawing, in which.

DETAILED DESCRIPTION OF THE PREFERRED EMBODIMENTS

Figure 1:
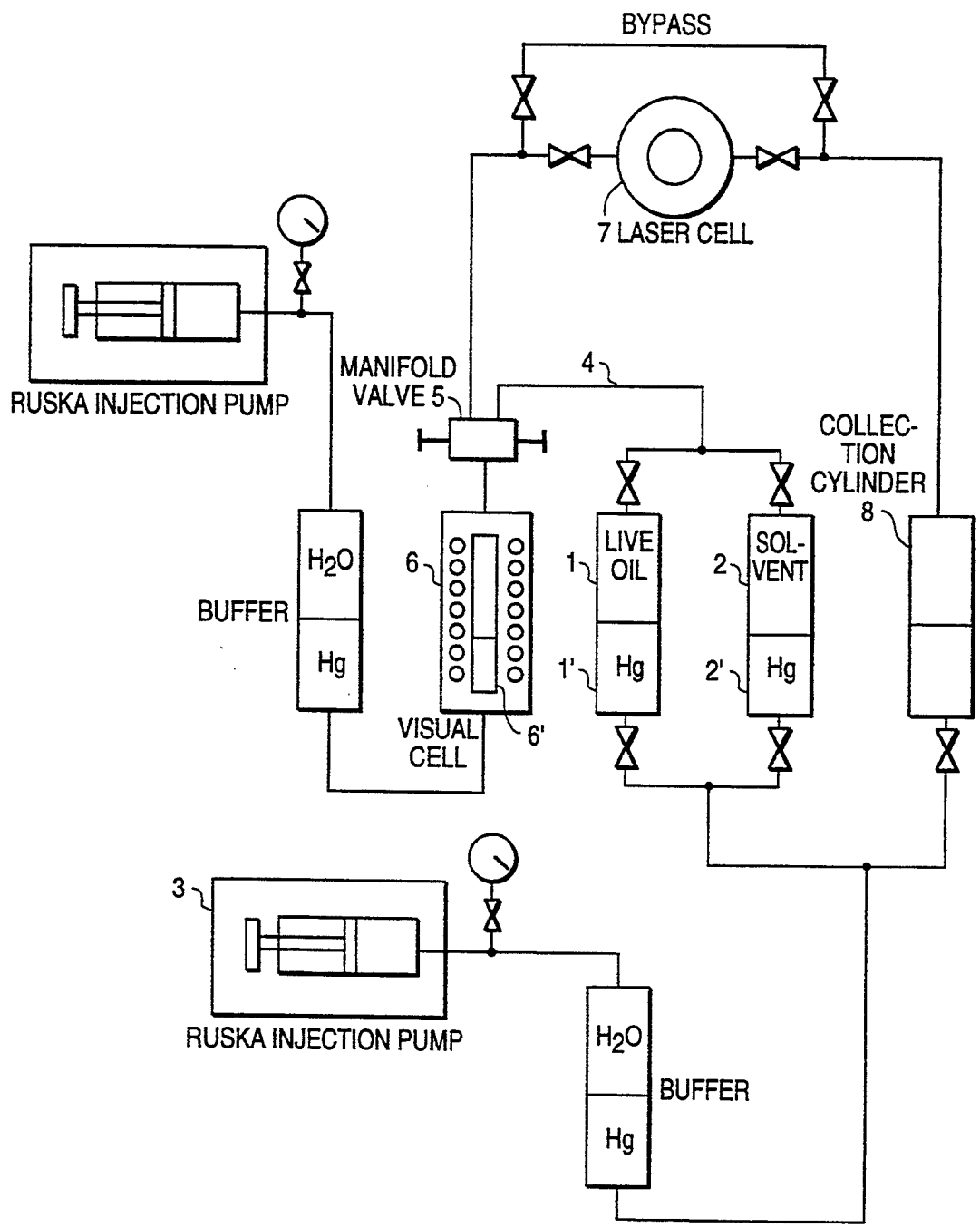
FIG. 1 is a schematic drawing of apparatus for determining the pressure and the temperature at which asphalt precipitation takes place from a crude oil specimen either in the presence of a miscible flooding solvent or in the borehole.

The compounds of formula I defined above, which are useful in the method of this invention, are known N,N-dialkylamides. The dialkyl components of the compounds of formula I can be the same or different and are preferably 1 to 3 carbon alkyl groups, and more preferably are methyl.

The fatty acid residue, $R_3C(O)-$, of compound I, defined above, may be a substituted or unsubstituted residue of a fatty acid which occurs in a vegetable oil. The vegetable oil may be selected from tall oil, palm oil, soybean oil, cottonseed oil, coconut oil, corn oil, peanut oil, canola oil, safflower oil, sunflower oil, babassu oil, castor oil, linseed oil, olive oil, and tung oil. In a preferred embodiment, the vegetable oil may be selected from tall oil, palm oil, and soybean oil.

In general, the dialkylamides of any carboxylic acid having 8 to 22 carbon atoms can be used in the methods of this invention. It is preferred to use those based on fatty acids having 18 carbon atoms such as stearic, oleic, linoleic, linolenic and ricinolenic acid, more preferably oleic acid. A particularly preferred dialkyl amide is N,N-dimethyl oleamide.

The amide of the vegetable oil, as defined above, is prepared by reacting the vegetable oil with an appropriate amine. For example, the dimethylamide of tall oil (DMATO) is prepared by reacting the tall oil fatty acids (TOFA) with dimethylamine ($R_1=R_2=$methyl). Similarly, the dimethylamides have been prepared for soybean oil (DMASO) and for palm oil (DMAPO). In so doing, the dimethylamide of each constituent fatty acid is prepared.

Generically, the compounds of formula I, defined above, can be prepared by combining the fatty acid and the appropriate amine under elevated temperature and pressure. In the case of DMATO, for example, the TOFA (tall oil fatty acid) fraction (1.0 mole) is mixed with a slight molar excess (1.1 mole) of dimethylamine. In the cases of other vegetable oils (soybean, palm) in which the fatty acids are present as triglycerides (3 fatty acids/triglyceride), 1.0 mole of the oil is mixed with 3.3 moles of the dimethylamine. These mixtures are heated slowly in a closed vessel to 170° C. at a pressure not to exceed 100 p.s.i. The reaction is held at this point for eight hours. Subsequent analyses have shown that this process achieves at least 95 percent amidation of the constituent fatty acids. In the case of DMATO, excess amine is removed in the aqueous phase formed by the water produced in the reaction. Where triglycerides are involved, excess amine is present in the glycerol phase removed after the reaction.

Formulations of N,N-dialkylamides containing common additives such as surfactants, emulsifiers or dispersants can also be used in the methods of this invention. A preferred formulation of a N,N-dialkylamide is "MFE 2400" product, sold by Buckman Laboratories of Canada, Ltd., Vaudreuil, Quebec, Canada. "MFE 2400" product is 90.1% DMATO and 9.9% "TDET 99" product, an ethoxylated dodecylphenol available from for example Harcross Chemicals Incorporated, Memphis, Tenn.

The liquid natural gas employed in miscible flooding is a readily available, liquefied mixture of low molecular weight gases comprised primarily of $C_1$ to $C_4$ hydrocarbons. This material is highly miscible in most, if not all crude oils. However, the asphalt present in crude oil is not soluble in the natural gas at reservoir conditions in most oil bearing formations. As a result, when the natural gas contacts the crude oil, asphalt is precipitated and it flocculates, frequently leading to plugging of the pores of the oil-bearing formations. Such precipitation and flocculation can be reduced and even prevented from taking place by addition of an effective amount of the above-described N,N-dialkylamide compound of formula I.

The other miscible flooding fluid to which this invention is applicable is liquid carbon dioxide ($CO_2$). Asphalt likewise precipitate from the crude oil and flocculates in the presence of liquid $CO_2$. The N,N-dialkylamides of formula I specified herein are also effective in reducing or even preventing such precipitation and flocculation from taking place when liquid $CO_2$ is employed as the flooding fluid.

Precipitation and flocculation of asphalt in the presence of flooding fluid appears to be a pressure related phenomenon. That is to say, when the asphalt-containing crude oil is in contact with a miscible flooding fluid, precipitation of asphalt is likely to occur at a relatively low pressure. This pressure is frequently less than the ambient geological pressure within the formation. In such cases, precipitation and flocculation of asphalt can occur in the formation, and this can result in plugging of the formation between the injection well and the production well.

In accordance with the first aspect of this invention, it has been found that incorporation of the N,N-dialkylamide of formula I into the flooding solvent increases the pressure at which asphalt precipitates and flocculates during miscible flooding. An effective amount of N,N-dialkylamide of formula I is defined as the amount required to increase the pressure at which asphalt begins to precipitate to a pressure greater than the ambient geological pressure within the crude oil-bearing formation being treated.

An effective amount of N,N-dialkylamide of formula I will usually be about 1 to 5 and preferably about 1 to 3% by volume based on the volume of the flooding solvent.

In addition to serving as a precipitation preventive, the N,N-dialkylamide of formula I can also function as a viscosifier when liquid $CO_2$ is employed as a miscible flooding solvent. The N,N-dialkylamide increases the viscosity of liquid $CO_2$ by about 60% at 130° C. and 4100 psig. Such a viscosity increase can improve the mobility ratio of a liquid $CO_2$ injection operation, resulting in a more uniform passage of oil through the formation, less "fingering" and, consequently, better recovery rates.

Determination of the relationship of ambient pressure solvent concentration with respect to oil and the effect of N,N-dialkylamide is carried out in the apparatus depicted in FIG. 1. The oil to be tested and the solvent containing N,N-dialkylamide are contained in source cylinders 1 and 2, respectively, at temperature and pressure conditions under which they remain in a single phase. Source cylinders 1 and 2 are pressured by a positive displacement pump 3, through water-mercury plugs 1' and 2', which act as pistons to transfer the oil and solvent through a common transfer line 4 and manifold 5, in predetermined ratio, to visual cylinder 6.

In visual cylinder 6, the combined crude oil and solvent mixture is pressured, also via a mercury plug 6', to the saturation pressure (Psat) and visual observations can be made of the degree of precipitation, if any, taking place at Psat in the visual cylinder. Psat is determined by adjusting the pressure in visual cylinder 6 to the point at which a gaseous phase begins to develop.

From the visual cell 6, the oil/solvent mixture is pumped through manifold 5 to laser cell 7 wherein precipitation is detected by laser beam transmittance. The laser cell can be shimmed to provide a flowpath from about 0.5 to 1.0 mm. This laser source is helium/neon, equipped with a photodiode detector on the opposite side of the flowpath. Laser transmittance is measured in millivolts. Transmittance increases with increasing concentration of the miscible flooding solvent as the clear solvent decreases the optical density of the crude oil. When the pressure of incipient precipitation is reached, transmittance begins to decrease as the oil/solvent mixture becomes cloudy due to development of a solvent phase in the oil.

From laser cell 7, the mixture passes to collection cell 8 for storage or disposal.

This aspect of the invention will be exemplified by the following examples, which are not intended to be limiting except as required by the claims set forth below.

EXAMPLE 1

A crude oil, known to be subject to asphalt precipitation, recovered from a formation having a temperature of 130° C. and 4100 psig was reconstituted by combining separator gas and separator oil previously recovered therefrom. This crude exhibited a saturation pressure of 3650 psig at 130° C. Using the apparatus described above, the subject crude was contacted with various mole percentages of a liquid natural gas flooding solvent having the approximate composition shown in Table 1.

TABLE 1

| Component | Mole % |
|---|---|
| $N_2$ | 0.0106 |
| methane | 0.6724 |
| ethane | 0.0706 |
| propane | 0.0887 |
| isobutane | 0.0527 |
| n-butane | 0.1050 |
| composite M.W. | 26.28 |

To demonstrate the increase in the pressure at which asphalt precipitation takes place, the reconstituted crude oil was contacted with liquid natural gas flooding solvent containing about 4.5 volume percent of "MFE 2400" and also with flooding solvent containing no "MFE 2400". The results are recorded in Table 2 along with results of a control in which no "MFE 2400" had been added to the flooding solvent. Observations were also made of an oil that was not in contact with a flooding solvent.

Precipitation of asphalt is deemed to have begun at the point where laser transmittance stops increasing and actually begins to decrease due to the appearance of solid matter in the oil. The solid matter is not always visible to the naked eye, but is readily detected by the laser.

TABLE 2

| Mol % Solvent | "MFE 2400" | Psat | Laser Trans | Visual Observation |
|---|---|---|---|---|
| 0 | No | 3650 | 1.730 | Clear |
| 15 | No | 3950 | 1.745 | " |
| 35 | No | 4225 | 1.786 | " |
| 46.3 | No | 4300 | 1.803 | " |
| 57.9 | No | 4300 | 1.776 | Solids |
| 64.5 | No | | 1.723 | Solids |
| 15 | Yes | 3935 | 1.881 | Clear |
| 25 | " | 4116 | 1.907 | Clear |
| 44.5 | " | 4820 | 1.952 | Clear |
| 48.1 | " | 4390 | 1.970 | Clear |
| 57.6 | " | 4466 | 2.016 | Solids |
| 64.1 | " | 4430 | 1.952 | " |

TABLE 2-continued

| Mol % Solvent | "MFE 2400" | Psat | Laser Trans | Visual Observation |
|---|---|---|---|---|
| 81.0 | " | 4180 | 1.800 | " |

The data in the table show that when the "MFE 2400" is present, both the pressure and the flooding solvent concentration at which precipitation takes place are increased.

EXAMPLE 2

Using the same crude oil, an evaluation was performed similar to that of Example I wherein liquid carbon dioxide was employed as the flooding solvent both with and without "MFE 2400". In the runs with "MFE 2400", "MFE 2400" was employed at the 3 volume percent level.

Results are recorded in Table 3.

TABLE 3

| Mole % Solvent | "MFE 2400" | Psat | Laser Trans | Visual Observation |
|---|---|---|---|---|
| 0 | No | 3335 | 1.569 | Clear |
| 20 | No | 3600 | 1.630 | " |
| 31.8 | No | 3725 | 1.659 | " |
| 46.3 | No | 3910 | 1.748 | " |
| 60.1 | No | 4030 | 1.330 | Solids |
| 68.1 | No | 4220 | 1.276 | " |
| 30 | Yes | 3810 | 1.509 | Clear |
| 47.5 | Yes | 3900 | 1.496 | Clear |
| 58.7 | Yes | 4010 | 1.481 | Clear |
| 70.0 | Yes | 4150 | 1.428 | Clear |
| 75.9 | Yes | 4800 | — | Some solids |
| 90.5 | Yes | 4423 | — | Solids |

In the second aspect of the invention an N,N-dialkylamide is employed to prevent precipitation of asphalt in the borehole.

In this aspect of the invention, the precipitation problem is temperature related. Precipitation takes places at some point in the borehole as a result of the temperature gradient between the reservoir and the well head. Very seldom is the ambient temperature at the well head sufficient to maintain the asphalt dissolved or suspended. Thus, the problem of precipitation in the borehole is an almost universal problem. Most oil wells require to be taken out of production on regular intervals, often as frequently as weekly for cleaning.

In treating to prevent asphalt precipitation in the borehole, neatly, N,N-dialkylamide of formula I is preferably injected into the oil at the lower extremity of the borehole at a point where the temperature is sufficient to prevent precipitation. An effective amount of a N,N-dialkylamide of formula I to reduce or even prevent precipitation in the miscible flooding procedure is here defined as an amount sufficient to reduce or even prevent precipitation of asphalt at the well head temperature. In general, an effective amount will be about 0.5 to 7% by volume based on the volume of oil being pumped.

The same N,N-dialkylamides of formula I are employed in this aspect of the invention. The preferred N,N-dialkylamides are those based on fatty acids having 18 carbon atoms such as stearic, oleic, linoleic, linolenic and ricinolenic acids. A particularly preferred N,N-dialkyl amide is N,N-dimethyl oleamide.

What is claimed is:

1. A method of reducing precipitation of asphalt from crude oil subject to such precipitation when subjected to conditions different from the conditions found in its geological reservoir, which method comprises contacting such crude oil with an effective amount of at least one compound of formula I

 (I)

wherein $R_1$ is a substituted or unsubstituted $C_1$-$C_6$ alkyl group; $R_2$ is a substituted or unsubstituted $C_1$-$C_6$ alkyl group; and $R_3C(O)$— is a substituted or unsubstituted fatty acid residue of 8 to 22 carbon atoms atoms.

2. A method according to claim 1 wherein the compound of Formula I is added in a solvent selected from liquid natural gas and liquid carbon dioxide.

3. An enhanced oil recovery method which comprises:
flooding into an oil-bearing formation through an injection well a miscible flooding solvent selected from liquid natural gas and liquid carbon dioxide, wherein the solvent contains at least one compound of formula I

 (I)

wherein $R_1$ is a substituted or unsubstituted $C_1$-$C_6$ alkyl group; $R_2$ is a substituted or unsubstituted $C_1$-$C_6$ alkyl group; and $R_3C(O)$— is a substituted or unsubstituted fatty acid residue of 8 to 22 carbon atoms atoms, in an amount effective to increase the pressure at which asphalt from crude oil begins to precipitate in the presence of the flooding solvent to a point greater than the ambient geological pressure in the formation.

4. The method according to claim 3 wherein the amount of said compound of formula I is about 1 to 5 volume percent based on the volume of the flooding solvent.

5. The method according to claim 4 wherein said compound of formula I is the dimethylamide of tall oil.

6. The method according to claim 4 wherein the flooding solvent is liquid natural gas.

7. The method according to claim 6 wherein said compound of formula I is the dimethylamide of tall oil.

8. The method according to claim 4 wherein the flooding solvent is liquid carbon dioxide.

9. The method according to claim 8 wherein said compound of formula I is the dimethylamide of tall oil.

10. A method of reducing precipitation of asphalt from crude oil in a producing borehole, which method comprises adding to the crude oil in the borehole, at a point where the asphalt is still stably dissolved or suspended in the crude oil, an amount of at least one compound of formula I

 (I)

wherein $R_1$ is a substituted or unsubstituted $C_1$-$C_6$ alkyl group; $R_2$ is a substituted or unsubstituted $C_1$-$C_6$ alkyl group; and $R_3C(O)$— is a substituted or unsubstituted fatty acid residue of 8 to 22 carbon atoms atoms sufficient to decrease the temperature at which asphalt begins to precipitate from said crude oil to a temperature lower than the temperature the crude oil will encounter at the well head.

11. A method according to claim 10 wherein the amount of said compound of formula I is about 0.5 to 7% by volume based on the crude oil being produced.

12. The method according to claim 10 wherein said compound of formula I is the dimethylamide of tall oil.

13. A method according to claim 10 wherein the compound of Formula I is added in a solvent selected from liquid natural gas and liquid carbon dioxide.

* * * * *